United States Patent
Gonzalez et al.

[19]

[11] Patent Number: 6,120,049
[45] Date of Patent: Sep. 19, 2000

[54] BICYCLE SHOCK ABSORBER INCLUDING LOCKOUT MEANS

[75] Inventors: Jose L. Gonzalez, Canyon Country; Eric E. Lalikyan, Van Nuys; Thomas J. Rogers, III, Saugus; Mark D. Savery, Valencia, all of Calif.

[73] Assignee: Answer Products, Inc., Valencia, Calif.

[21] Appl. No.: 09/181,878

[22] Filed: Oct. 29, 1998

[51] Int. Cl.$^7$ .................................................. B62K 25/08
[52] U.S. Cl. ................... 280/276; 188/319.1; 188/319.2; 188/322.15; 188/322.22; 188/282.5
[58] Field of Search ................................... 280/276, 283, 280/285; 188/319.1, 319.2, 322.22, 322.15, 266.1, 282.5, 282.9, 316, 317, 282.1, 285, 281, 299.1; 267/64.15

[56] References Cited

U.S. PATENT DOCUMENTS

| | | |
|---|---|---|
| 3,827,538 | 8/1974 | Morgan . |
| 4,795,009 | 1/1989 | Tanahashi et al. . |
| 4,971,344 | 11/1990 | Turner . |
| 5,098,120 | 3/1992 | Hayashi et al. . |
| 5,158,161 | 10/1992 | Yamaoka et al. . |
| 5,186,481 | 2/1993 | Turner . |
| 5,195,766 | 3/1993 | Dohrmann et al. . |
| 5,246,092 | 9/1993 | Yamaoka . |
| 5,445,401 | 8/1995 | Bradbury . |
| 5,449,188 | 9/1995 | Ohma ...................................... 280/276 |
| 5,452,910 | 9/1995 | Harris . |
| 5,456,480 | 10/1995 | Turner et al. . |
| 5,478,099 | 12/1995 | Kawahara ............................... 280/276 |
| 5,494,302 | 2/1996 | Farris et al. . |
| 5,509,677 | 4/1996 | Bradbury . |
| 5,533,597 | 7/1996 | Nezu et al. . |
| 5,580,075 | 12/1996 | Turner et al. . |
| 5,597,169 | 1/1997 | Bradbury . |
| 5,632,362 | 5/1997 | Leitner . |
| 5,634,652 | 6/1997 | Tsai ........................................ 280/276 |
| 5,634,653 | 6/1997 | Browning ................................ 280/276 |
| 5,848,675 | 12/1998 | Gonzalez ................................ 280/276 |
| 5,934,697 | 8/1999 | McAndrews ........................... 280/276 |
| 6,026,939 | 2/2000 | Girvih et al. ........................... 280/276 |

OTHER PUBLICATIONS

"1998 Answer MANITOU SX–TI Fork," Mountain Bike Action, Jul. 1997.
"The Contender," Mountain Biking, Oct. 1997, pp. 32, 35, 36.
"Manitou TPC SX Ti Suspension Fork" (publication and date unknown).
"Answer Putting Pressure on Suspension Rivals" (publication and date unknown).
"Owner's Manual Ruby Road Fork," Ruby's Owner Manual, PN 60210, Rock Shox, Mar., 1997, pp. 1–16.
"Seeing Double," Bicycling, Jun. 1998, pp. 107 and 108.
"Manitou TPC SX Ti Suspension Fork" Velo News, May 1998.
"Answer Putting Pressure on Suspension Rivals," Bicycle Retailer & Industry News, Mar. 1997.

Primary Examiner—Douglas C. Butler
Attorney, Agent, or Firm—Laubscher & Laubscher

[57] ABSTRACT

An improved shock absorber for use in the front fork suspension of a mountain bicycle includes a housing having a pair of telescopically-arranged cylinders containing a rebound damping piston, a compression damping piston, and a lockout damping piston arranged on the opposite side of the compression piston from the rebound piston, a manually-operable lockout shut-off valve being provided that is operable independently of the compression damping piston between a closed lockout condition in which the lockout piston is activated, and an open condition in which the lockout piston is de-activated, thereby to change the operating characteristics of the shock absorber. The compression piston, the lockout piston, and the lockout shut-off valve are connected to define an assembly that is removably connected as a unit with the upper end of the shock absorber housing, thereby to permit removal of the assembly for adjustment of a flow control device associated with the compression piston. An independently adjustable rebound piston arrangement is provided at the lower end of the shock absorber housing for damping the rebound strokes of the shock absorber. All of the pistons are provided with blow-off valves so that the return action of one piston does not influence another piston.

20 Claims, 8 Drawing Sheets

PRIOR ART

FIG. 1

PRIOR ART

FIG. 1A

PRIOR ART

PRIOR ART

BICYCLE SHOCK ABSORBER INCLUDING LOCKOUT MEANS

CROSS-REFERENCE TO RELATED APPLICATION

This application is related to the copending application of Jose L. Gonzales and Thomas J. Rogers, III Ser. No. 09/081,157 filed May 18, 1998 entitled "Damping Apparatus for Bicycle Forks", which is a continuation application of parent application Ser. No. 08/725,409 filed Oct. 3, 1996 entitled "Oil Damped Fork".

BACKGROUND OF THE INVENTION

1. Field of the Invention

This invention relates to a shock absorber for use with the front suspension fork of a mountain bike or the like, including a housing having a chamber containing independently operable compression, rebound and lockout piston means, said lockout piston means being arranged in the housing on the opposite side of said compression piston means from said rebound piston means, and a lock-out valve manually operable by the user between a closed lockout condition in which the lockout piston means is activated for operation upon the occurrence of a severe compression overload condition, and an open condition in which the lockout piston means is de-activated. The operation of the lockout piston means is independent of the operation of the compression piston means.

2. Brief Description of the Prior Art

Various types of shock absorbers for use in mountain bicycles have been proposed in the patented prior art, as evidenced, for example, by the prior patents to Turner U.S. Pat. Nos. 4,971,344, 5,186,481, and 5,580,075, Yamaoka U.S. Pat. No. 5,246,092, and Dohrman et al U.S. Pat. No. 5,195,766, among others.

Figure 1:
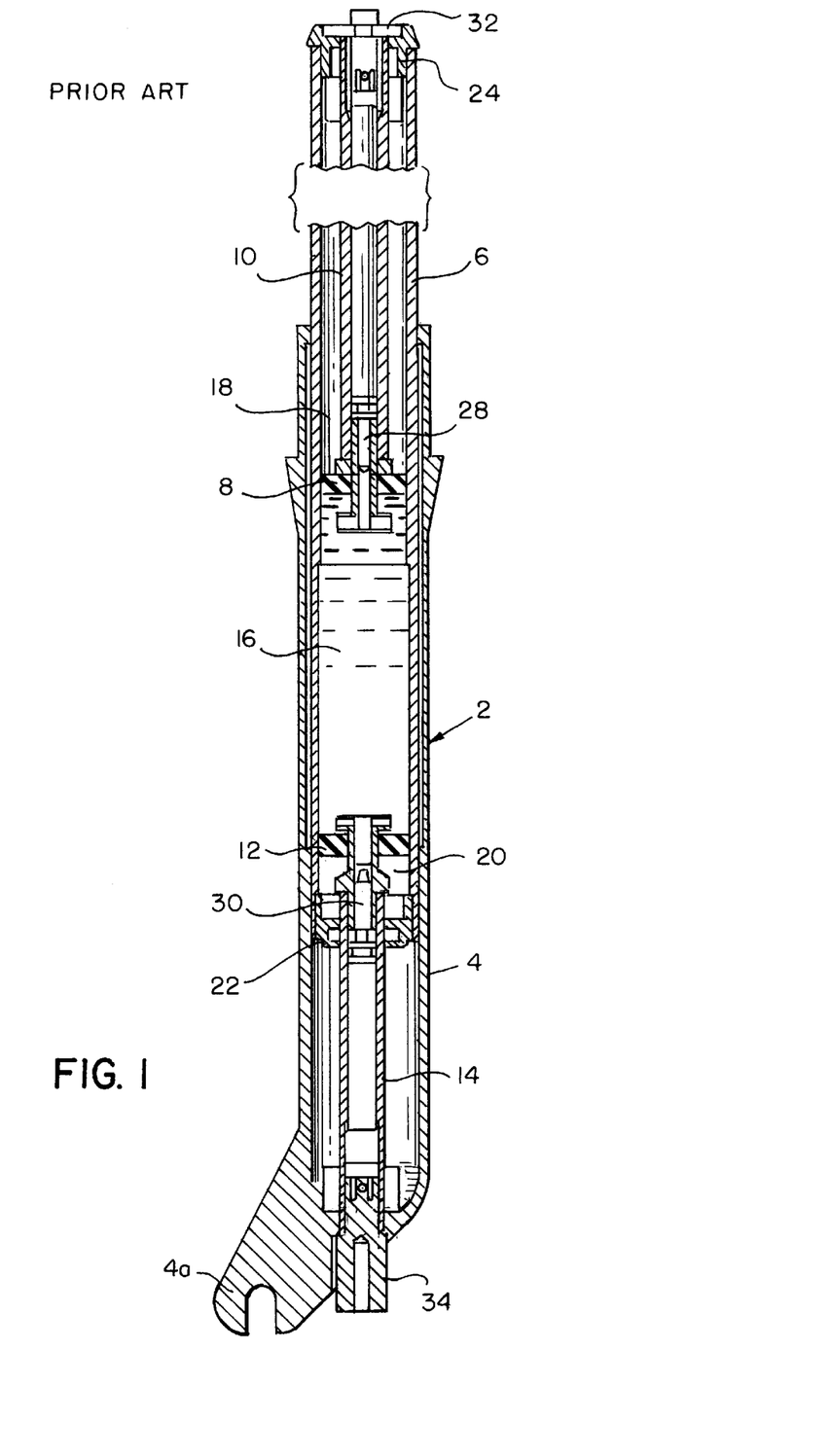
FIG. 1 is a sectional view of the twin piston chamber shock absorber of the prior art when in the rebound condition.
Figure 1A:
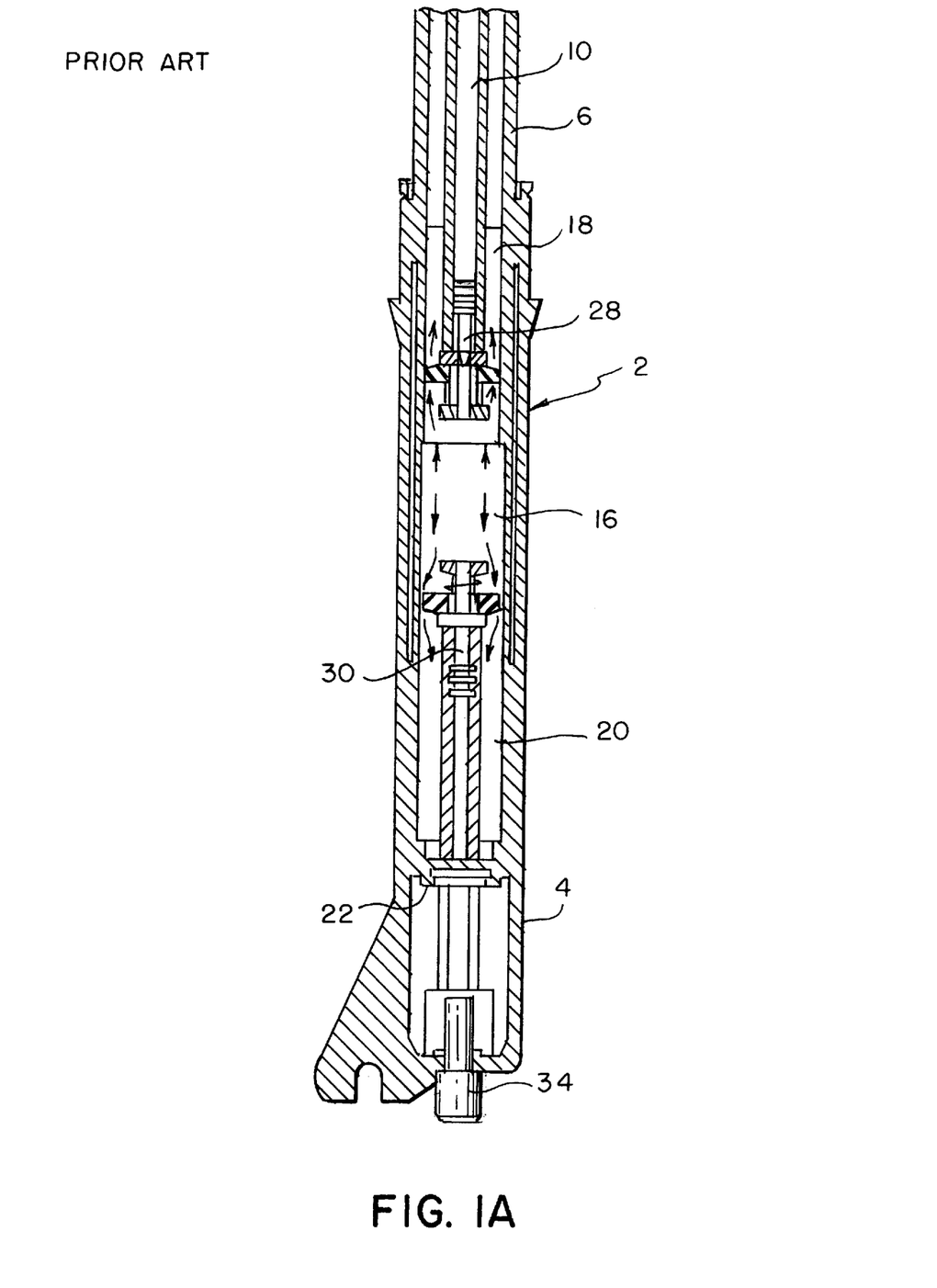
FIG. 1A is a somewhat diagrammatic illustration of the apparatus of FIG. 1 when in the compressed condition.

It is well known in the art to provide manually-operable adjustment means for controlling or customizing the operation of the shock absorbers in accordance with the size and/or weight of the rider, or with the nature of the expected riding conditions. For example, as illustrated in FIGS. 1 and 1A of the accompanying drawings, in the MANITOU TPC Twin Piston Chamber shock absorber produced by Answer Products, Inc., of Valencia, Calif., the assignee of the instant application, a shock absorber is provided having a housing defined by a pair of telescopically-arranged cylinders and containing compression and rebound piston means that define therebetween a main central chamber containing a damping fluid, and compression and rebound chambers on opposite sides of said main chamber, each of said compression and rebound piston means being provided with manually-operable adjustment needle means for controlling the flow of damping fluid from the main center chamber to and from the compression and rebound chambers during the compression and rebound strokes of the shock absorber. This prior shock absorber is the subject of the Gonzales et al U.S. patent application Ser. No. 09/081,157 filed May 18, 1998, which is a continuation application of application Ser. No. 08/725,409 filed Oct. 3, 1996.

Figure 2:
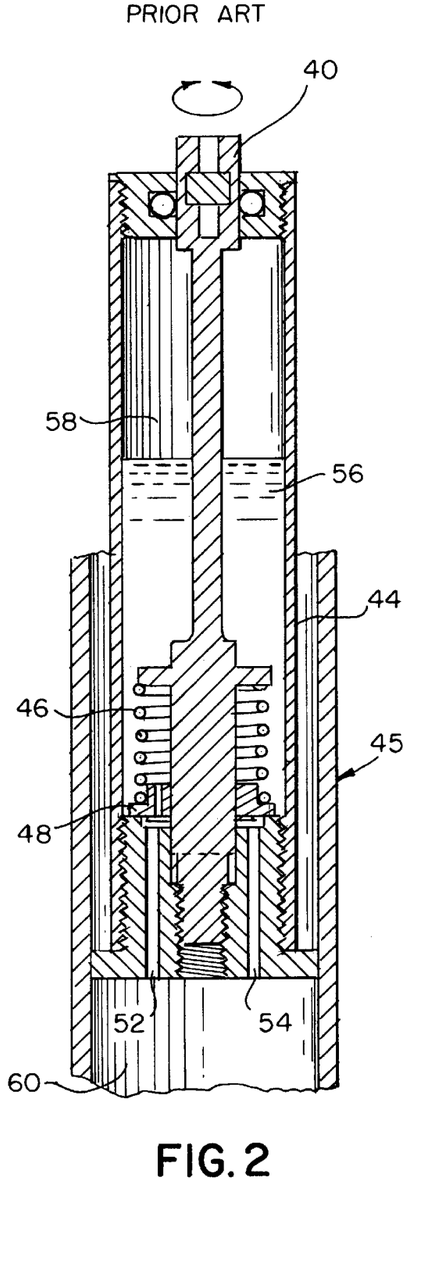
FIG. 2 is a sectional view of the prior art shock absorber of the Turner U.S. Pat. No. 5,186,481.
Figure 3:
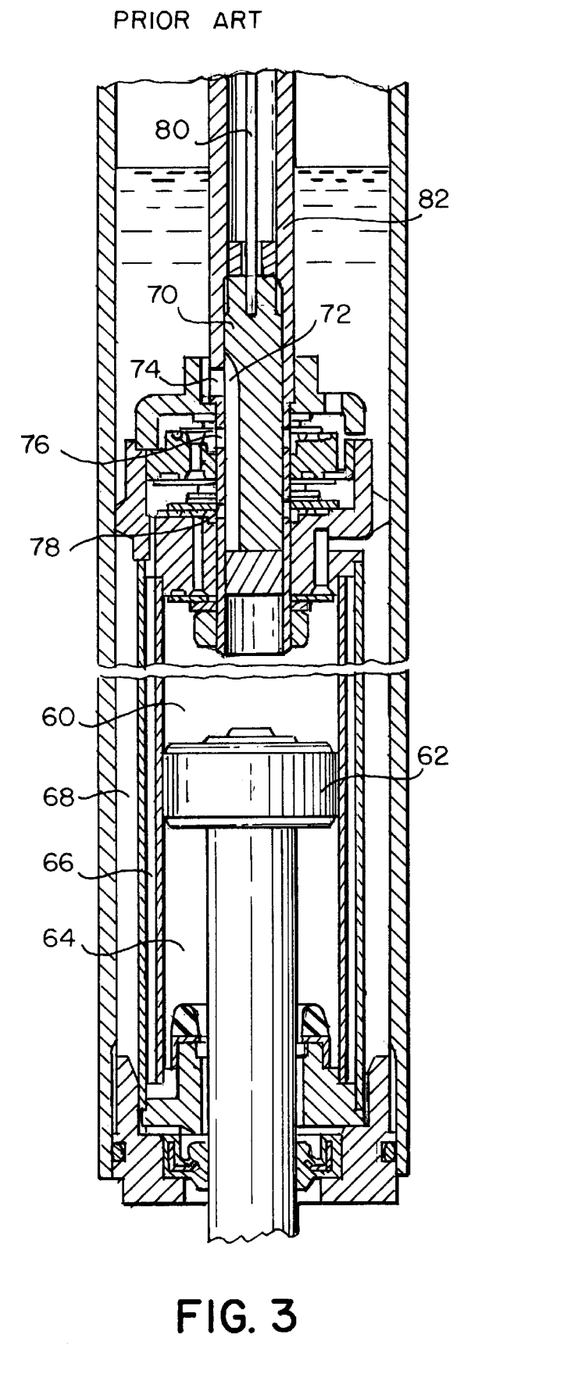
FIG. 3 is a sectional view of the prior art shock absorber of the Yamaoka U.S. Pat. No. 5,246,092.

Similarly, the shock absorber of the Turner U.S. Pat. No. 5,186,481 illustrated in FIG. 2 of the drawings includes an adjustment knob for varying the preload of a biasing spring to compensate for a full variety of rider weights and abilities. In the Yamaoka U.S. Pat. No. 5,246,092, as shown in FIG. 3 of the drawings, a rotary control valve is provided for adjusting the opening areas of orifices of an hydraulic shock absorber of a vehicle, thereby to change the magnitude of the various damping compression and rebound forces as desired. A recent front fork suspension system for mountain bikes including manually-operable lockout means is the RUBY SL fork manufactured by RockShox, Inc. of San Jose, Calif.

During certain riding situations, like steep climbing or racing on level ground, it has been found that restricting movement of the suspension fork can improve the pedaling performance of the rider. The present invention was developed to provide an improved shock absorber of the twin piston chamber type for mountain bikes, wherein the operation of the shock absorber is improved by providing a selectively-operable lockout piston that is connected in-line with the compression piston, manually-operable means being provided for selectively operating the shock absorber between a closed lockout condition in which the lockout piston is activated and the compression piston is substantially de-activated, and an open condition in which the lockout piston is de-activated and the compression piston operates in its usual manner.

SUMMARY OF THE INVENTION

Accordingly, a primary object of the present invention is to provide an improved shock absorber for use in the front suspension fork of a mountain bike, including a housing defined by a pair of telescopically-arranged cylinders containing rebound piston means, compression piston means, lockout piston means arranged on the opposite side of said compression piston means from said rebound piston means and connected in-line with the compression piston means, and lockout shut-off valve that are manually-operable by the rider between closed and open positions for activating and de-activating the lockout piston means independently of the operation of the compression piston means.

According to another object of the invention, the compression piston means includes a bypass passage that affords constant communication between the intermediate oil reservoir chamber defined between the compression and rebound piston means,. and the compression chamber, flow adjustment means being provided for adjusting the flow of bypass damping fluid through the compression bypass passage. Preferably, the flow adjusting means comprises a metered orifice, and in order to permit adjustment of the metered orifice, the compression piston means, the lockout piston means, and the compression bypass adjustment means are connected as an assembly that is removable as a unit from the upper end of the shock absorber housing. The lockout damping means is non-adjustable and includes a lockout damping valve that is biased by a lockout biasing spring having a predetermined spring rate. Thus, any adjustment of the compression operation are made by the metered orifice and affect only compression damping and do not affect lockout performance. Consequently, a user can set up the compression damping as desired, and the activation and de-activation of the lockout piston means does not alter the compression damping setting.

According to another object of the invention, the rebound piston means, the compression piston means, and the lockout means are operable independently of each other and are each provided with blow-off valve means that cancel that operation of the associated valve upon the occurrence of damping fluid flow in the opposing direction, thereby to prevent cavitation of the various chambers.

BRIEF DESCRIPTION OF THE PATENT DRAWINGS

Other objects and advantages of the invention will become apparent from a study of the following specification when viewed in the light of the accompanying drawings, in which.

DETAILED DESCRIPTION

Referring first more particularly to FIGS. 1 and 1A, the illustrated prior art bicycle shock absorber is the subject matter of the Jose Gonzales et al., U.S. patent application Ser. No. 09/081,1257 filed May 18, 1998, which is a continuation application based on U.S. application Ser. No. 08/725,409 filed Oct. 3, 1996. This product is marketed by Answer Products, Inc., of Valencia, Calif., the instant applicant, under the trademark MANITOU TPC (Twin Piston Chamber). The shock absorber 2 includes telescopically-arranged outer and inner cylinder legs 4 and 6 that define one arm of the conventional front suspension fork of a mountain bicycle. The lower cylinder leg 4 is connected at its lower end 4a with the front axle (not shown) of the bicycle, and the upper leg is connected with the conventional crown member (not shown) that is connected with the steering shaft of the bicycle.

Compression piston assembly 8 is connected with the upper cylinder 6 by hollow compression shaft 10, and rebound piston 12 assembly is connected with lower cylinder leg 4 by hollow rebound shaft 14. Central chamber 16 containing damping oil is defined between the pistons, and compression and rebound chambers 18 and 20 are defined above and below the compression and rebound pistons, respectively. Lower annular leak-proof seal means 22 are carried by the lower end of the inner cylinder 6 for sealing the lower end of the rebound chamber, and upper leak-proof seal means 24 seal the upper end of the compression chamber.

Compression needle means 28 control the flow of oil between the central chamber 16 and the compression chamber 18 when the shock absorber is subjected to compression, and rebound needle means 30 control the flow of oil between the central chamber 16 and the rebound chamber 20 during rebound operation of the shock absorber. In order to adjust the compression operation of the shock absorber, adjustment knob 32 is connected with compression shaft 10 to vertically adjust the position of needle valve 28 relative to its seat. Similarly, rebound operation may be independently adjusted by rotating rebound adjustment knob 34 to adjust the vertical position of needle valve 30 relative to its seat.

Other adjustment means have been proposed in the prior art for adjusting the compression and/or rebound operation of a shock absorber. Referring to FIG. 2, in the prior art Turner U.S. Pat. No. 5,186,481, a rotary adjustment knob 40 is provided for rotating the adjustment rod 42 of the upper tube 44 of a telescoping shock absorber assembly 45, thereby to adjust the preload tension of helical biasing spring 46 to compensate for a full variety of rider weights. Preload spring 46 normally maintains the compression valve plate 48 in the closed position relative to metering valve 50 having ports 52 and 54, thereby regulating the flow of oil 56 from the upper chamber 58 to the lower chamber 60 of the shock absorber.

As shown in FIG. 3, in the Yamaoka U.S. Pat. No. 5,246,092, a hydraulic shock absorber is disclosed which includes damping means for restricting fluid flow between an upper chamber 60 above piston 62, a lower chamber 64, an outer chamber 66, and a reservoir chamber 68. Damping adjusting means are provided for adjusting the magnitudes of the various damping forces, including a rotary adjusting pin 70 having a longitudinal groove 72 which communicates with ports 74. 76, and 78 to provide a variable orifice. Consequently, rotation of adjusting pin 70 by control rod 80 relative to stationary support rod 82 causes variation in the opening area of the orifices to change the magnitudes of the various clamping forces.

Figure 4:
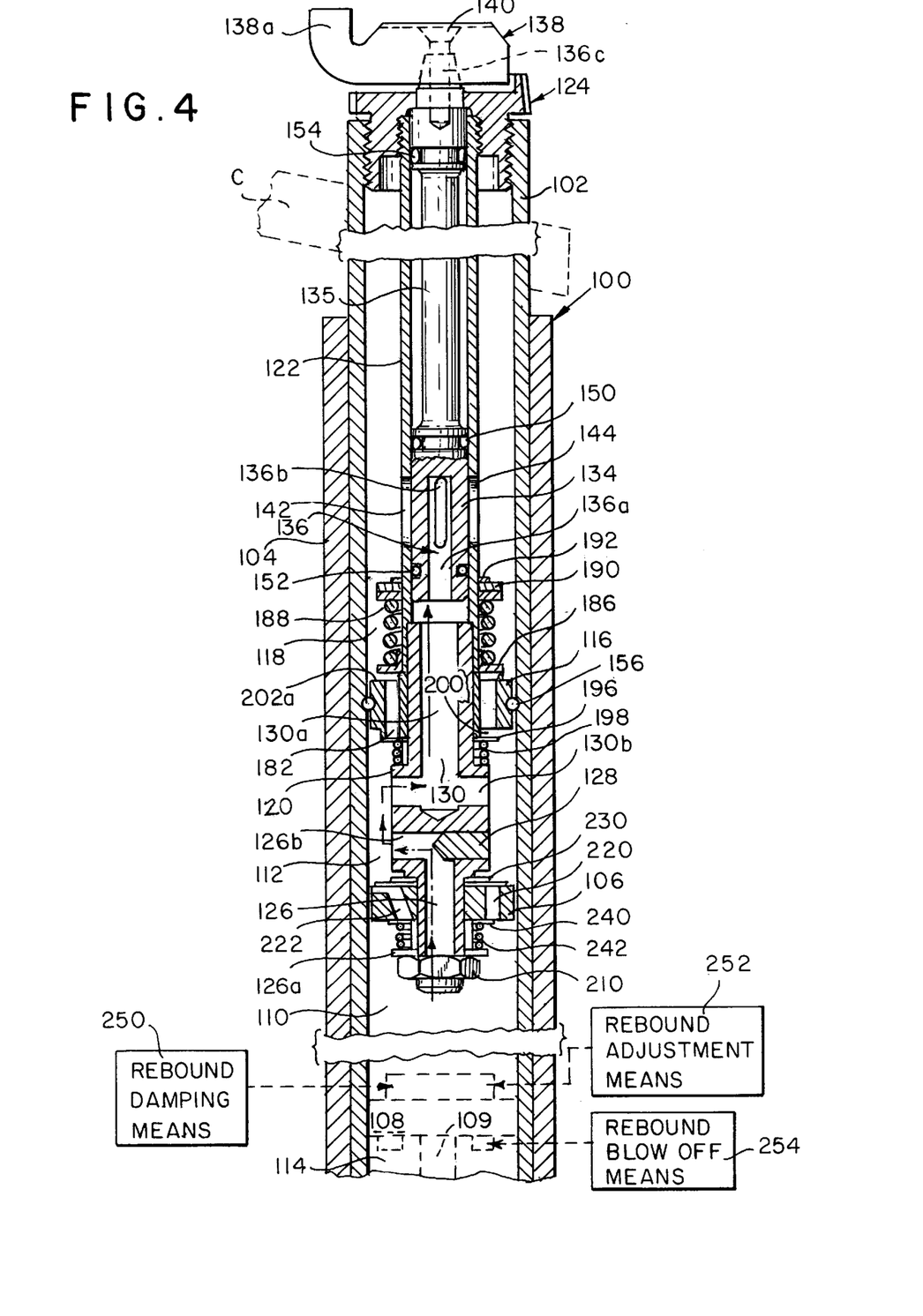
FIGS. 4 and 5 are detailed sectional views of the improved combined compression and lockout arrangement of the present invention when in the lockout activated and de-activated conditions, respectively.
Figure 5:
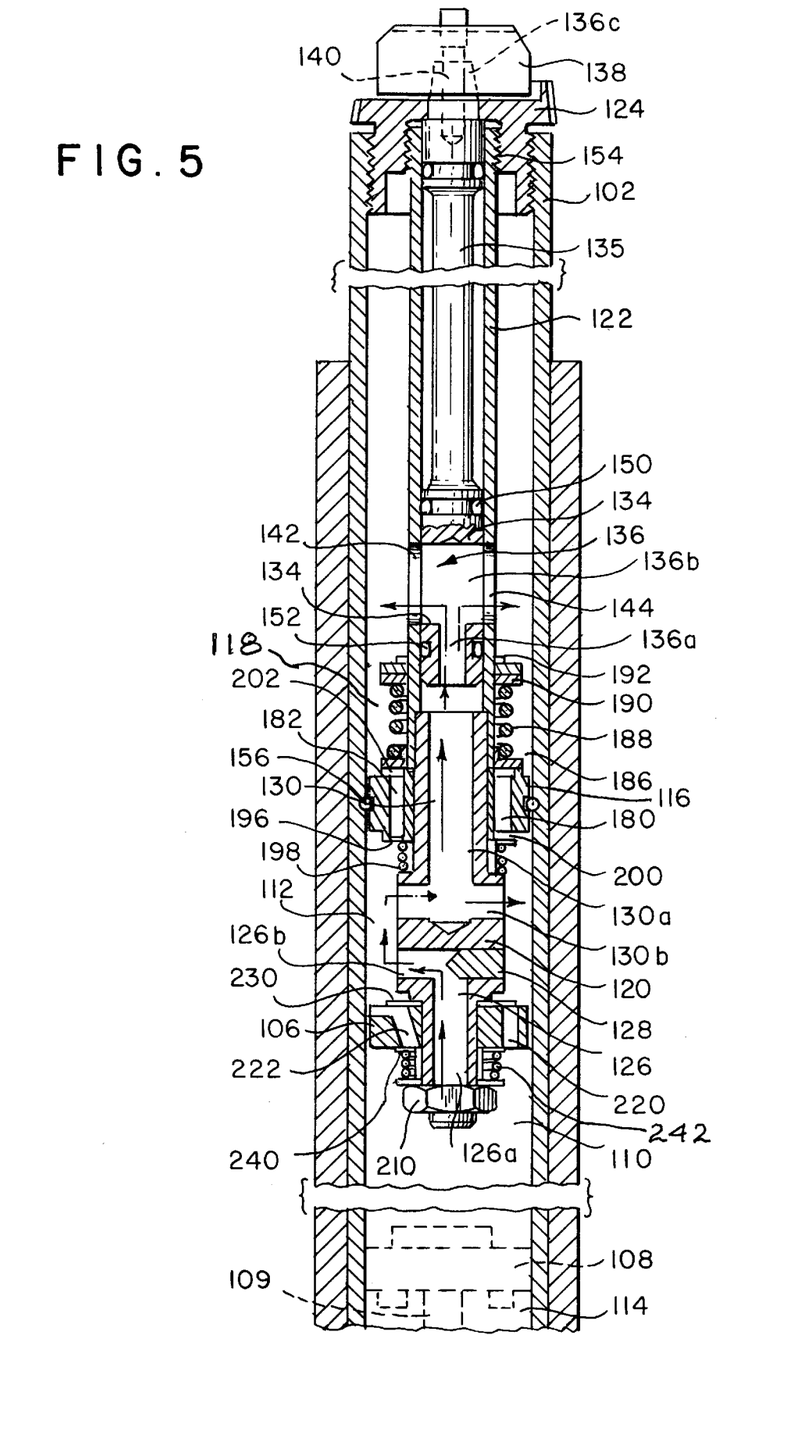

Referring now to FIGS. 4 and 5, according to the improved shock absorber of the present invention, the shock absorber housing 100 includes inner and outer telescopically arranged cylinders 102 and 104 that are adapted for connection with the steering crown C and the front axle, respectively, when the shock absorber is connected in one leg of the front suspension fork of the mountain bicycle, as is known in the art. The shock absorber includes a compression piston 106 and a rebound piston 108 that are connected with the upper and lower ends of the inner and outer cylinders, respectively, which pistons define therebetweeen an intermediate chamber oil reservoir chamber 110. Compression chamber 112 and rebound chamber 114 are defined on the opposite sides of the compression and rebound pistons from the intermediate chamber 110. In accordance with a characterizing feature of the present invention, a lockout piston 116 is provided in the inner cylinder between the compression piston 106 and the upper end of the inner cylinder, thereby to define a lockout chamber 118 on the opposite side of lockout piston 116 from the compression chamber 112.

The compression piston 106 and the lockout piston 116 are of annular configuration and are concentrically mounted upon the cylindrical piston support member 120 that is threadably connected at its upper end within the lower end of tubular support sleeve 22. The upper end of the tubular support sleeve 122 is threadably connected within a threaded bore contained in cap member 124, which cap member, in turn, is threadably connected with the upper end of the inner cylinder 102. Thus, the piston support member 120 is suspended from the upper end of the inner cylinder 102 by means of cap member 124 and tubular support sleeve 122. At its lower end, the piston support member 120 contains a compression bypass passage 126 that affords constant communication between the intermediate chamber 110 and the compression chamber 112, said compression bypassage 126 including a vertical first portion 126a that extends upwardly from the lower extremity of the piston support member 120, and a radially outwardly directed second portion 126b. As will be described in greater detail below, a set screw 128 is provided for adjustably controlling the flow of fluid through the compression piston bypass passage 126. At its upper end, the piston support member 120 contains a lockout piston bypass passage 130 having a vertical portion 130a that extends downwardly from the upper extremity of the piston support member, and a radially outwardly extending lower portion 130b that extends diametrically across the piston support body 120. Rotatably mounted in the support sleeve 122 above the upper end of the piston support member 120 is a rotary lockout shut-off valve member 134 that is integral with the lower end of valve stem 135 the upper end of which extends rotatably through a corresponding bore contained in the cap member 124. Operating handle 138 is non-rotatably connected with the upper end of the valve stem 135 by means of locking screw 140. At its lower end, the shut-off valve member i 34 contains a lockout passage 136 having at its lower end a vertical lower portion 136a, and a radially extending transverse portion 136b that extends diametrically across the valve body. Valve member 134, valve stem 135, and operating know 138 are rotatable from the closed position illustrated in FIG. 4 to the open position illustrated in FIG. 5, whereupon the radial transverse portion 136b of the lockout passage 136 is in communication with a pair of diametrically opposed ports 142 and 144 that are contained in the support sleeve 122. Thus, when the shut-off valve 134 is in the open position illustrated in FIG. 5, damping fluid contained in the intermediate chamber 110 is supplied to the lockout chamber 118 via the vertical portion 126a of compression bypass passage 126, radial portion 126b, compression chamber 112, radial lower portion 130b of the lockout bypass passage 130, vertical portion 130a, the vertical portion 136a of the lockout passage 136, radial portion 136b, and the ports 142 and 144 contained in the support sleeve 142. O-rings 150 and 152 arranged concentrically in grooves contained in the valve member 134 on opposite sides of the ports 142 and 144 provide a seal between the valve member 134 and the inner surface of the support sleeve 130, and a similar O-ring 154 provides a seal between the top of the valve stem 136 and the inner surface of the support sleeve 122. A further O-ring 156 provides a seal between the lockout piston 116 and the inner surface of the wall of the inner cylinder 102.

Figure 6:
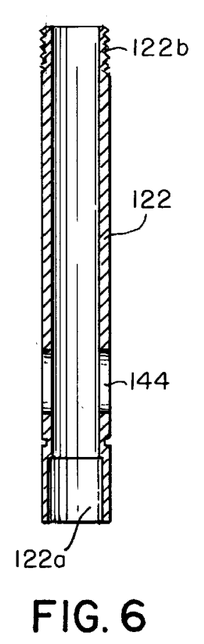
FIGS. 6, 7 and 8 are sectional, side elevation and top plan views, respectively, of the upper sleeve member of FIG. 4.
Figure 7:
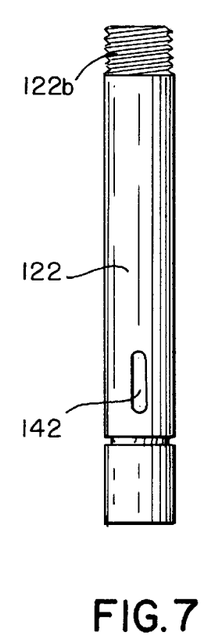
Figure 8:
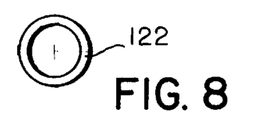
Figure 9:
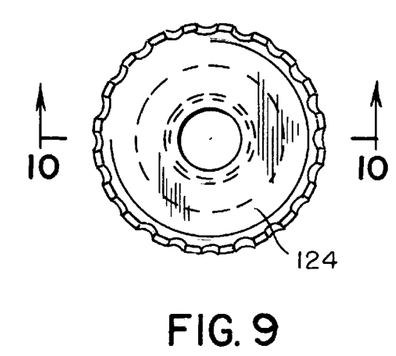
FIG. 9 is a top plan view of the lockout cap member of FIG. 4.
Figure 10:
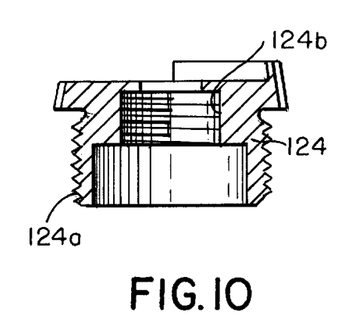
FIG. 10 is a sectional view taken along line 10—10 of FIG. 9.
Figure 11:
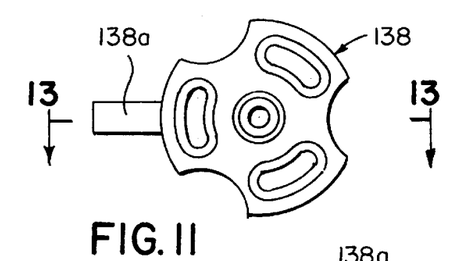
FIGS. 11 and 12 are bottom and top views, respectively, of the lockout knob of FIG. 4.
Figure 12:
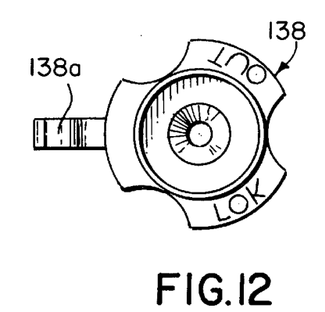
Figure 13:
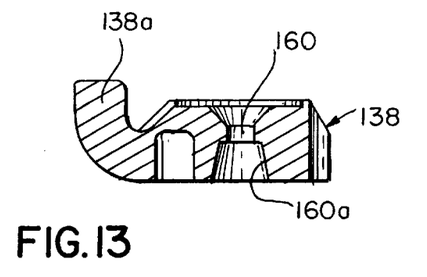
FIG. 13 is a sectional view taken along line 13—13 of FIG. 1.

The structure of the support sleeve 122 is shown in FIGS. 6–8. The lower internal portion 122a of the sleeve is internally threaded for connection with the upper end of the piston support member 120, and the upper end 122b of the sleeve is externally threaded for connection with the cap 124. As shown in FIGS. 9 and 10, the cap 124 has an externally threaded lower portion 124a for threaded connection with the upper end of the inner sleeve member 102, and an internally threaded upper counterbored portion 124b threadably connected with the upper end portion 122b of the sleeve 122. The details of the operating knob 138 are shown in FIGS. 11–13, wherein the lower surface 160a of the through bore 160 is tapered for receiving the conical upper extremity 136c of the valve stem 136. The operating knob 138 has a radially outwardly and upwardly extending finger portion 138a.

Figure 14:
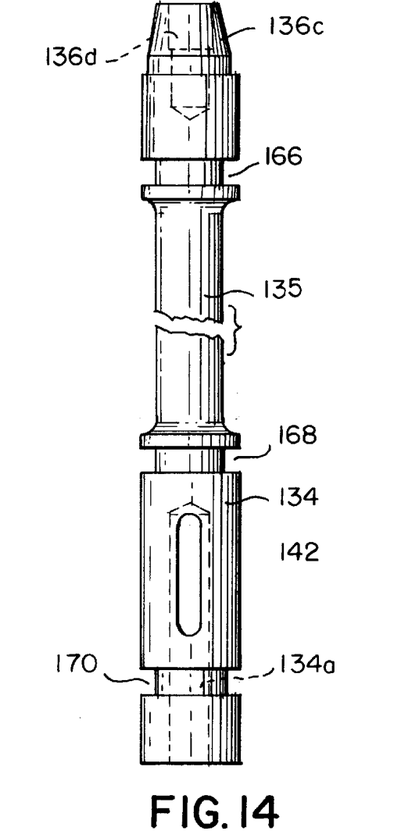
FIGS. 14, 15 and 16 are side elevation, bottom, and top views, respectively, of the lockout shaft of FIG. 4.
Figure 15:
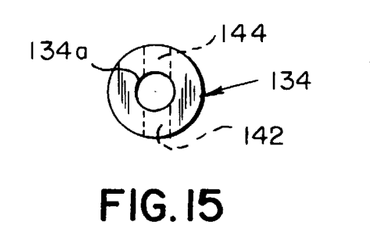
Figure 16:
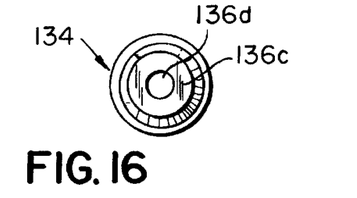

Referring now to FIGS. 14–16, it will be seen that the lockout shut-off valve 134 contains three longitudinally spaced grooves 166, 168, and 170 for receiving the O-rings 154, 150, and 152, respectively. The conical upper extremity 136c of the valve stem portion 136 contains a threaded bore 136d for receiving the locking screw 140 which fastens the knob 138 to valve stem 136.

Figure 17:
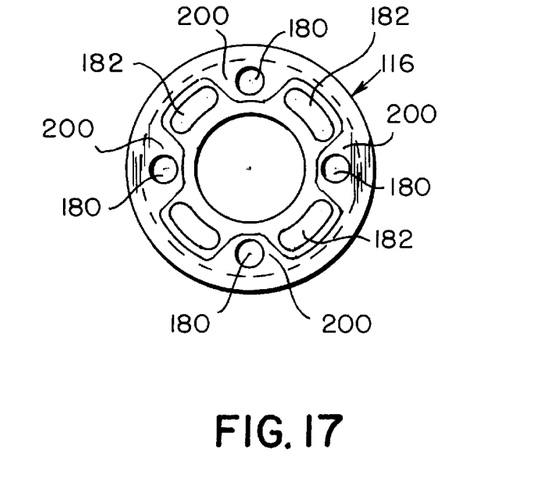
FIGS. 17 and 18 are bottom and top plan views, respectively, of the lockout piston of FIG. 4.
Figure 18:
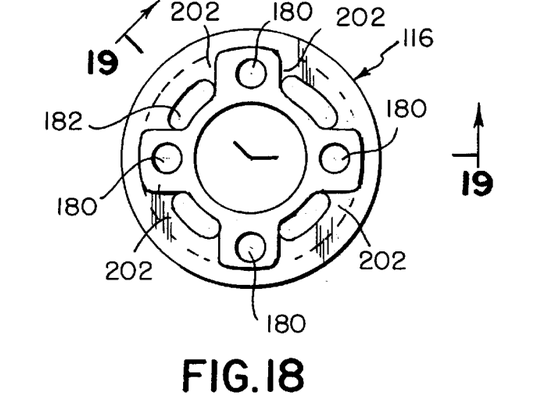
Figure 19:
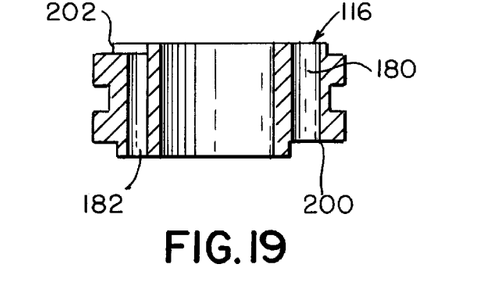
FIG. 19 is a sectional view taken along line 19—19 of FIG. 18.

Referring now to FIGS. 17–19, it will be seen that the lockout piston 116 is of annular construction and contains a plurality of circumferentially-arranged lockout damping passages 180, and a plurality of circumferentially spaced vertically extending lockout blow-off passages 182. The upper ends of the lockout damping passages 180 are normally closed by a lockout damping valve member 186 that is biased by helical spring 188 toward the closed position relative to the damping passage 180. Helical spring 188 is in abutting engagement at its upper end with a pair of washers 190 that are retained in place by the C-clip retaining element 192. The lower ends of the lockout blow-off passages 182 are normally closed by a disk valve member 196 that is biased upwardly by the coiled spring 198 that reacts at its lower end with a corresponding annular shoulder formed on the piston support member 120. The lockout damping passages 180 are in continuous communication with the compression chamber 112 via radially inwardly extending grooves 200 contained in the bottom face of the lockout piston, as shown in FIG. 17. Similarly, the lockout blow-off passages 182 are in constant communication at their upper end with the lockout chamber 118 via radially inwardly directed grooves 202 contained in the top surface of the lockout piston, as shown in FIG. 18.

Figure 20:
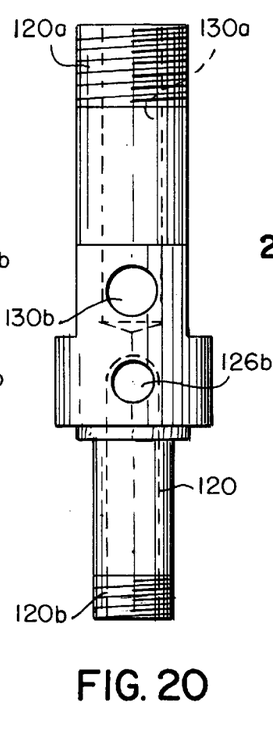
FIGS. 20 and 21 are side elevation and bottom plan views, respectively, of the compression piston seat.
Figure 21:
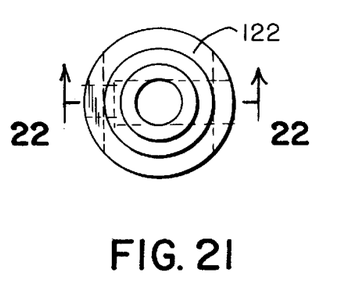
Figure 22:
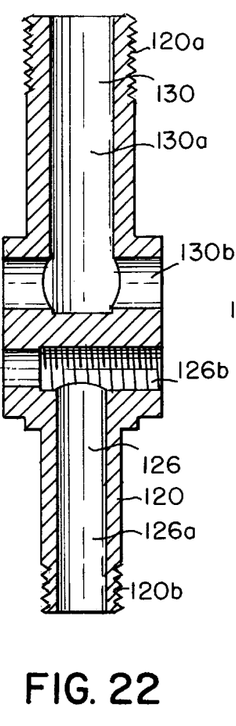
FIG. 22 is a sectional view taken along line 22—22 of FIG. 21.

The structural details of the piston support member 120 are shown in FIGS. 20–22. More particularly, the upper and lower end portions 120a and 120b are externally threaded for connection with the support sleeve 122 and with a retaining nut 210, respectively. At its upper end, the piston support member includes the lockout piston bypass passage 130, and at its lower end, the member is provided with the compression piston bypass passage 126. The diametrically extending upper portion 126b of the compression piston bypass passage 126 is internally threaded for receiving the set screw 128 of FIG. 4.

Figure 23:
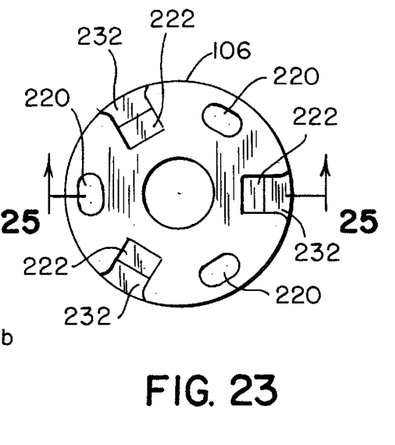
FIGS. 23 and 24 are top and bottom views, respectively, of the compression valve body of FIG. 4.
Figure 24:
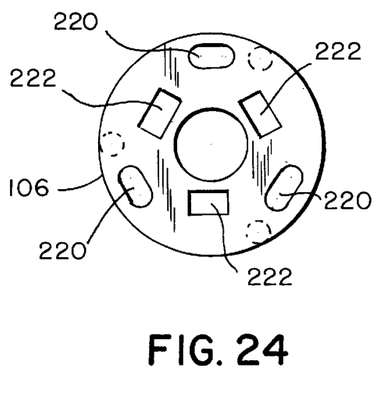
Figure 25:
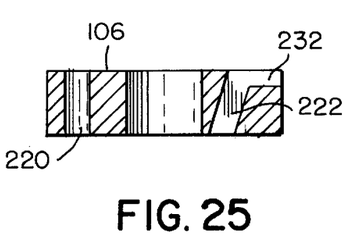
FIG. 25 is a sectional view taken along line 25—25 of FIG. 23.

Referring now to FIGS. 23–25, the compression piston 106 contains a plurality of longitudinally-extending circumferentially-arranged compression damping passages 220, and a plurality of circumferentially-arranged blow-off passages 222. The upper ends of the compression damping passages 220 are normally closed by the compression damping shims 230, the lower ends of the compression damping passages 220 being in constant communication with the intermediate chamber 110. The upper end surface of the compression piston includes a plurality of radially inwardly directed grooves 232 that afford constant communication between the upper ends of the compression blow-off passages 222 and the compression chamber 112. The lower ends of the compression blow-off passages 222 are closed by a compression blow-off valve 240 that is biased toward the close position by helical spring 242 that reacts at its lower end with the retaining nut 210.

The rebound piston 108 is connected with the lower end of the outer cylinder 104 by a connecting sleeve 109 in a manner similar to that shown in the embodiment of FIG. 1. The rebound cylinder is provided with conventional rebound damping means 250, rebound adjustment means 252, and rebound blow-off means 254, in the same manner as shown in the prior art embodiment of FIG. 1. The specific details of the rebound piston do not constitute a part of the instant invention, and consequently, additional description has been omitted.

Operation

Assume that the shut-off valve member 134 is in its closed position, shown in FIG. 4, and that a longitudinal compressive shock force is imparted to the housing 100. The inner and outer cylinders 102 and 104 are displaced together against the biasing force of the shock absorber main spring (not shown) to displace fluid from intermediate oil reservoir chamber 110 into the lockout damping passages 180 via the compression piston bypass passage 126, compression chamber 112, and the radially inwardly directed grooves 200 contained in the bottom surface of the lockout piston 116. When the pressure of the lockout damping fluid exceeds the biasing force of lockout spring 188, lockout valve 186 opens to supply damping fluid to damping chamber 118 via damping passage 180, thereby to dampen the applied shock force. As the inner and outer cylinders are subsequently biased aprt by the main shock absorber spring means, damping fluid is returned to the intermediate chamber 114 via lockout blow-off passage 182, lockout blowoff valve 196, compression chamber 112, compression blowoff valve chamber 222, and compression blowoff valve means 240. During this rebound operation, fluid from intermediate chamber 110 is supplied to rebound chamber 114 via rebound damping means 250, as is known in the art. Upon completion of rebound, the fluid is returned from the rebound chamber 114 to the intermediate chamber 110 via rebound blowoff means 254.

Assume now that the lever 138a of lockout knob 130 is rotated through an angle of 90° to turn lockout valve 134 to the open position of FIG. 5. Upon the application of a longitudinal compressive shock force to the shock absorber housing, the inner and outer cylinders are displaced together against the force of the main shock absorber biasing spring, whereupon fluid from intermediate chamber 110 is initially supplied to lockout chamber 118 via compression bypass passage 126, compression chamber 112, lockout piston bypass passage 130, and lockout valve passage 136. Owing to the restriction of compression bypass passage 126 produced by the setting of adjusting set screw 128, damping fluid will also fluid from intermediate chamber 110 to the compression chamber 112 via damping passage 220 and shim valve 230, thereby to damp the applied shock force.

Upon rebound of the piston, fluid is returned from lockout chamber 118 to compression chamber 112 via lockout valve passage 136 and lockout bypass passage 130 (and, to some extent, through the lockout blowoff passage 182 and blowoff valve 196), and from compression chamber 112 to intermediate chamber 110 via compression blowoff passage 222 and blowoff valve 240.

It is apparent that when the lockout lever is activated, the forces required to allow flow through the lockout piston are so much higher than what would be required to flow through the compression piston, that the compression piston function is basically cancelled. When the lever is de-activated, the oil no longer has to flow through the lockout piston, as it can bypass it via the port controlled by the lever. At this time, the compression piston is fully functional and controls the compression damping characteristics making both systems truly independent.

In the event it is desired to adjust the operation of the compression piston means in accordance with the physical characteristics of the rider, or of the terrain conditions of use, cap 124 is unscrewed from the top of support sleeve 102, and the assembly including cap 124, sleeve 122, shut-off valve 134, piston support member 120, and pistons 116 and 106 is removed as a unit from the top of the inner cylinder 102. Following adjustment of the set screw 128 and/or the adjusting nut 210, the assembly is reintroduced within the upper end of the inner cylinder 102, and the cap 124 is again threadably connected with the upper end of the inner cylinder 102.

It is apparent that various changes may be made in the disclosed invention, such as the location of the set screw 128 in the bypass passage between the intermediate 110 and the lockout chamber 118, and the provision of adjustment means for adjusting the operation of the lockout damping valve 186. While in accordance with the patent Statutes the preferred forms and embodiments of the invention have been illustrated and described, it will be apparent to those skilled in the art that further modifications and embodiments may be made without deviating from the inventive concepts set forth above.

What is claimed is:

1. A shock absorber for use in the front fork of a mountain bike, comprising:
   (a) a housing (100) including a pair of generally vertical inner (102) and outer (104) telescopically arranged tubular cylinders, said inner cylinder having a closed upper end adapted for connection with the steering column of the bicycle, said outer cylinder having a closed lower end adapted for connection with the axle of the front wheel of the bicycle;
   (b) compression piston means (106) and rebound piston means (108) arranged in said inner cylinder for defining therebetween an intermediate chamber (110) for receiving damping fluid,
      (1) said compression piston means and said rebound piston means being connected with the upper end of said inner cylinder and with the lower end of said outer cylinder, respectively, thereby to define compression (112) and rebound (114) chambers above said compression piston and below said rebound piston, respectively;
      (2) said compression piston means including compression damping means (230) affording communication between said intermediate chamber and said compression chamber when the pressure differential between said intermediate chamber and said compression chamber exceeds a first given value upon the application of a longitudinal compressive shock force to said tubular housing cylinders;
   (c) lockout piston means (116) arranged in said inner chamber between said compression piston means and said inner chamber upper end for defining in said inner cylinder a lockout chamber (118) on the opposite side of said lockout piston means from said compression chamber, said lockout piston means including lockout damping means (186) affording communication between said compression chamber and said lockout chamber when the pressure differential between said compression chamber and said lockout chamber exceeds a second given value; and
   (d) manually-operable lockout shut-off valve means (134) operable to de-activate and to activate said lockout means, respectively, independently of said compression piston means.

2. Apparatus as defined in claim 1, wherein said compression piston means contains a compression bypass passage (126) affording continuous communication between said intermediate chamber and said compression chamber; and further wherein said lockout piston means includes a lockout bypass passage (130) affording communication between said compression chamber and said lockout chamber, said lockout shut-off valve means being connected to alternately open and close said lockout bypass passage.

3. Apparatus as defined in claim 2, wherein said lockout piston means includes a lockout piston (116); and further wherein said lockout damping means includes a lockout damping passage (180) contained in said lockout piston for affording communication between said compression and said lockout chambers, and pressure-responsive lockout damping valve means (186) arranged in said lockout chamber for normally closing said lockout damping passage, said lockout damping valve means being opened when the pressure differential between said compression chamber and said lockout chamber exceeds a predetermined second value.

4. Apparatus as defined in claim 3, wherein said lockout piston contains a lockout blow-off passage (182) affording communication between said lockout chamber and said compression chamber; and further including pressure-responsive lockout blow-off valve means (196) arranged in said compression chamber for normally closing said lockout blow-off passage, said lockout blow-off valve means being opened when the pressure differential between said lockout chamber and said compression chamber exceeds a third predetermined value.

5. Apparatus as defined in claim 4, wherein said compression piston damping means comprises a compression damping passage (220) affording communication between said intermediate chamber and said compression chamber, and pressure-responsive compression damping valve means (230) contained in said compression chamber for normally closing said compression damping passage, said compression damping valve means being opened when the pressure differential between said compression and lockout chambers exceeds a predetermined value.

6. Apparatus as defined in claim 5, wherein said compression piston contains a blow-off passage (222) affording communication between said compression and intermediate chambers, and further including pressure-responsive compression blow-off valve means (240) arranged in said intermediate chamber for normally closing said blow-off compression passage, said compression blow-off valve means being opened when the pressure differential between said compression chamber and said intermediate chamber exceeds a fourth predetermined value.

7. Apparatus as defined in claim 2, and further including adjustable control means (128) for controlling the flow of damping fluid through said compression bypass passage.

8. Apparatus as defined in claim 7, wherein said compression piston means, said lockout piston means, and said lockout operating means are connected to define an upper compression and lockout damping assembly that is removable as a unit from the upper end of said inner cylinder, thereby to permit adjustment of said compression bypass passage adjustable control means.

9. Apparatus as defined in claim 8, wherein said compression bypass passage adjustable control means includes a metered orifice.

10. Apparatus as defined in claim 8, wherein said upper compression and lockout damping assembly includes:
   (a) a vertical cylindrical sleeve member arranged in concentrically spaced relation collinearly within said inner cylinder;
   (b) cap means removably connecting the upper end of said sleeve member with the upper end of said inner cylinder; and
   (c) a generally cylindrical vertically-arranged piston support member having an upper end threadably connected within the lower end of said sleeve, and a lower end that extends downwardly from said sleeve, said compression piston being annular and being mounted concentrically on and adjacent the lower end of said piston support member, said lock-out piston being annular and being mounted concentrically on said piston support member in spaced relation above said compression piston,
   (1) said compression bypass passage being contained in the lower end of said piston support member and having a first portion extending upwardly from the lower extremity of said piston support member to a location above said compression piston and a radially outwardly directed second portion that communicates with said compression chamber;
   (2) said lockout bypass passage being contained in the upper end of said piston support member and including at its upper end a first vertical portion that extends downwardly from the upper extremity of said piston support body to a point below said lockout piston, and a second radial portion that extends outwardly in communication with said compression chamber.

11. Apparatus as defined in claim 10, wherein said lockout shut-off valve means includes a cylindrical shut-off valve member (134) mounted coaxially within said sleeve member for rotational movement about its longitudinal axis between open and closed positions relative to said sleeve member when said shut-off valve means is in its open and closed conditions, respectively, said shut-off valve member containing a vertical bore extending upwardly from the lower extremity of said valve member, and at least one radial bore extending radially outwardly from the upper end of said vertical bore, said shut-off valve member vertical bore being in constant communication with the upper end of said lockout bypass passage contained in said piston support member; and further wherein said sleeve member contains a lockout port affording communication between said lockout valve member radial bore and said lock-out chamber when said shut-off valve member is in said open position.

12. Apparatus as defined in claim 11, and further including a vertical valve stem (136) arranged in said sleeve above said shut-off valve member, said valve stem being connected at its lower end with said shut-off valve member and extending at its upper end for rotation within a corresponding through bore contained in said cap member; and an operating knob (138) connected with the upper extremity of said valve stem for manually rotating said shut-off valve member between said open and closed positions, respectively.

13. Apparatus as defined in claim 12, and further including a pair of first vertically-spaced O-ring seal means arranged concentrically on said shut-off valve member above and below said radial bore for sealing the space between said shut-off valve member and said sleeve above and below said radial bore.

14. Apparatus as defined in claim 10, wherein said lockout damping valve means comprises an annular lockout disk arranged within said inner cylinder concentrically about said sleeve member adjacent the upper end surface of said lockout piston, and a helical compression lockout spring arranged concentrically about said sleeve member above said lockout disk for biasing said lockout disk in a direction to normally close said lockout damping passage contained in said lockout piston.

15. Apparatus as defined in claim 14, and further including means defining an annular fixed abutment extending concentrically about said sleeve member and against which the upper end of said lockout spring reacts.

16. Apparatus as defined in claim 15, and further including second O-ring seal means arranged concentrically about said lockout piston for sealing the space between said lockout piston and said sleeve member.

17. Apparatus as defined in claim 10, wherein the lower extremity of said sleeve member defines a shoulder that limits the upper extend of displacement of said lockout piston relative to said piston support member; and further wherein said lockout piston blow-off valve means comprises an annular blow-off disk arranged in said compression chamber concentrically about said piston support member adjacent the lower end surface of said lockout piston, and a helical lockout blow-off spring arranged concentrically about said piston support member below said lockout blow-off disk for biasing said blow-off disk toward a closed position relative to the lockout blow-off passage.

18. Apparatus as defined in claim 17, wherein the bottom end surface of said lockout piston contains a first radial groove affording constant communication between said compression chamber and said lockout damping passage.

19. Apparatus as defined in claim 18, wherein the upper end surface of said lockout piston contains a second radial groove affording continuous communication between said lockout chamber and said lockout blow-off passage.

20. Apparatus as defined in claim 15, wherein said piston support member includes a first integral annular shoulder against which the lower end of said lockout blow-off spring reacts, and a second integral annular shoulder that defines an abutment against which the upper end surface of said compression abuts.

* * * * *